(12) United States Patent
Kirchhoff

(10) Patent No.: US 12,466,532 B1
(45) Date of Patent: Nov. 11, 2025

(54) MARINE PROPULSION SYSTEMS AND CONTROL METHODS

(71) Applicant: Brunswick Corporation, Mettawa, IL (US)

(72) Inventor: Thomas S. Kirchhoff, Waupaca, WI (US)

(73) Assignee: Brunswick Corporation, Mettawa, IL (US)

(*) Notice: Subject to any disclaimer, the term of this patent is extended or adjusted under 35 U.S.C. 154(b) by 293 days.

(21) Appl. No.: 18/470,114

(22) Filed: Sep. 19, 2023

(51) Int. Cl.
  *B63H 21/21* (2006.01)
  *B60L 15/20* (2006.01)
  *B60L 15/40* (2006.01)
  *B63H 21/17* (2006.01)

(52) U.S. Cl.
  CPC .......... *B63H 21/21* (2013.01); *B60L 15/2045* (2013.01); *B60L 15/40* (2013.01); *B63H 21/17* (2013.01); *B60L 2200/32* (2013.01); *B60L 2250/16* (2013.01); *B60L 2260/52* (2013.01); *B60L 2260/54* (2013.01); *B63H 2021/216* (2013.01)

(58) Field of Classification Search
  CPC .. B63H 21/21; B63H 21/17; B63H 2021/216; B60L 15/2045; B60L 15/40; B60L 2200/32; B60L 2250/16; B60L 2260/52; B60L 2260/54
  See application file for complete search history.

(56) References Cited

U.S. PATENT DOCUMENTS

| | | |
|---|---|---|
| 6,507,164 B1 | 1/2003 | Healey et al. |
| 6,652,330 B1 | 11/2003 | Wasilewski |
| 6,885,919 B1 | 4/2005 | Wyant et al. |
| 7,150,664 B1 | 12/2006 | Uppgard et al. |
| 7,218,118 B1 | 5/2007 | Gonring |

(Continued)

FOREIGN PATENT DOCUMENTS

KR  101466320  11/2014

OTHER PUBLICATIONS

Unpublished U.S. Appl. No. 17/574,284 by Jared Kalnins filed Jan. 12, 2022.

(Continued)

*Primary Examiner* — Richard M Camby
(74) *Attorney, Agent, or Firm* — Andrus Intellectual Property Law, LLP

(57) ABSTRACT

A method for controlling a marine drive configured to propel a marine vessel. The method includes receiving a destination for the marine vessel, receiving a demand request for operating the marine drive, and operating the marine drive at an actual demand corresponding to the demand request. The method further includes determining a required energy for the marine drive to propel the marine vessel to the destination at the actual demand and determining a remaining energy of an energy source available for operating the marine drive. The method further includes comparing the required energy to the remaining energy and, when the remaining energy is less than the required energy, automatically iteratively reducing the actual demand for operating the marine drive until the remaining energy equals or exceeds the required energy determined for the marine vessel to reach the destination.

20 Claims, 7 Drawing Sheets

(56) References Cited

U.S. PATENT DOCUMENTS

| | | |
|---|---|---|
| 7,255,616 B1 | 8/2007 | Caldwell |
| 7,385,365 B2 | 6/2008 | Feick |
| 7,467,595 B1 | 12/2008 | Lanyi et al. |
| 10,358,997 B1 * | 7/2019 | Anschuetz .......... F02D 41/1475 |
| 11,673,633 B1 * | 6/2023 | Arbuckle ............... B63H 21/21 |
| | | 701/21 |
| 2023/0053671 A1 * | 2/2023 | Gonring .................. B60L 50/60 |
| 2023/0054361 A1 * | 2/2023 | Kirchhoff ................ B63H 1/14 |
| 2023/0219675 A1 * | 7/2023 | Janeczko ................ B60L 58/12 |
| | | 440/6 |
| 2023/0219676 A1 * | 7/2023 | Kalnins .................. B63H 21/17 |
| | | 701/21 |
| 2024/0253751 A1 * | 8/2024 | Kirchhoff ............... B63B 79/20 |

OTHER PUBLICATIONS

Unpublished U.S. Appl. No. 17/574,303 by Jason Janeczko filed Jan. 12, 2022.

* cited by examiner

MARINE PROPULSION SYSTEMS AND CONTROL METHODS

FIELD

The present disclosure generally relates to marine propulsions systems and methods for controlling marine propulsion systems such that a marine vessel may reach a destination.

BACKGROUND

The following provide background information and are incorporated by reference in entirety.

U.S. Pat. No. 6,885,919 discloses a process by which the operator of a marine vessel can invoke the operation of a computer program that investigates various alternatives that can improve the range of the marine vessel. The distance between the current location of the marine vessel and a desired waypoint is determined and compared to a range of the marine vessel which is determined as a function of available fuel, vessel speed, fuel usage rate, and engine speed. The computer program investigates the results that would be achieved, theoretically, from a change in engine speed. The operator is informed when an advantageous change in engine speed is determined.

U.S. patent application Ser. No. 17/574,303 discloses a method of controlling an electric marine propulsion system to propel a marine vessel, whereby the method includes receiving a user-set time, determining a time remaining based on the user-set time, and identifying a battery charge level of a power storage system on the marine vessel. A required battery power is then determined based on the time remaining and the battery charge level, and then an output limit is determined based on the required battery power to enable propelling the marine vessel for the user-set time without recharging the power storage system. The propulsion system is automatically controlled so as not to exceed the output limit.

U.S. patent application Ser. No. 17/574,284 discloses a method of controlling an electric marine propulsion system configured to propel a marine vessel, whereby the method includes receiving a user-set distance, identifying a battery charge level of a power storage system on a marine vessel and identifying an energy utilization value. An output limit is then determined based on a remaining distance, the battery charge level, and the energy utilization value. The propulsion system is then automatically controlled so as to not exceed the output limit, enabling the marine vessel to travel the user-set distance without recharging the power storage system.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect of the present disclosure generally relates to a method for controlling a marine drive configured to propel a marine vessel. The method includes receiving a destination for the marine vessel, receiving a demand request for operating the marine drive, and operating the marine drive at an actual demand corresponding to the demand request. The method further includes determining a required energy for the marine drive to propel the marine vessel to the destination at the actual demand and determining a remaining energy of an energy source available for operating the marine drive. The method further includes comparing the required energy to the remaining energy and, when the remaining energy is less than the required energy, automatically iteratively reducing the actual demand for operating the marine drive until the remaining energy equals or exceeds the required energy determined for the marine vessel to reach the destination.

In certain examples, the method further includes generating a notification on a user interface when the actual demand for operating the marine drive is reduced from the demand request.

In certain examples, the method further includes visually displaying on a display device a range in which the marine drive may propel the marine vessel based on the remaining energy. In further embodiments, the range comprises a first range and a second range corresponding to operating the marine drive at the demand request and at the actual demand, respectively, when the actual demand is reduced from the demand request.

In certain examples, the method further includes visually displaying the demand request and the actual demand when the actual demand is reduced from the demand request. Further embodiments include wirelessly communicating with an external device, wherein the step of visually displaying is performed on a display of the external device.

In certain examples, the method further includes wirelessly communicating with an external device, wherein the destination is received from the external device.

In certain examples, the required energy is determined such that at least a safety reserve is estimated to remain in the remaining energy when the marine vessel reaches the destination.

In certain examples, the energy source is a battery system that provides electrical energy as the remaining energy for operating the marine drive.

In certain examples, the method further includes controlling the actual demand of the marine drive to correspond to the demand request when the demand request is less than the actual demand.

In certain examples, the method further includes detecting when the marine drive becomes engaged to propel the marine vessel, and further comprising resetting the actual demand for operating the marine drive to the demand request when the marine drive becomes engaged.

In certain examples, the actual demand of the marine drive is iteratively reduced by a set amount every set time period until the remaining energy equals or exceeds the required energy for the marine vessel to reach the destination. In further examples, the marine drive has a maximum demand for operation, and wherein the set amount is 10% of the maximum demand and the set time period is at least 2 seconds between each iteration.

In certain examples, the method further includes, after reducing the actual demand for operating the marine drive, increasing the actual demand for operating the marine drive when the remaining energy exceeds the required energy by more than a threshold.

In certain examples, the required energy and the remaining energy are determined as moving averages over time to thereby smooth fluctuations.

In certain examples, the method further includes, for at least the steps of determining the required energy for operating the marine drive, determining the remaining energy of the energy source, and comparing the required energy to the remaining energy are performed at a predefined frequency.

In certain examples, the marine drive in which the actual demand is iteratively reduced is an electric marine drive and the energy source includes a battery.

Another aspect of the present disclosure generally relates to a propulsion system for a marine vessel. The propulsion system includes a marine drive configured to propel the marine vessel. A control system is operatively coupled to the marine drive and configured to control operation thereof. The control system is configured to receive a destination for the marine vessel, receive a demand request for operating the marine drive, and to operate the marine drive at an actual demand corresponding to the demand request. The control system is further configured to determine a required energy for the marine drive to propel the marine vessel to the destination at the actual demand and determine a remaining energy of an energy source available for operating the marine drive. The control system is further configured to compare the required energy to the remaining energy and, when the remaining energy is less than the required energy, automatically iteratively reduce the actual demand of the marine drive until the remaining energy equals or exceeds the required energy determined for the marine vessel to reach the destination.

In certain examples, the control system is configured to be operatively coupled with a display device and to cause the display device to display the demand request and the actual demand when the actual demand is reduced from the demand request.

In certain examples, the control system is configured to be operatively coupled with a display device and to cause the display device to display a range in which the marine drive may propel the marine vessel based on the remaining energy and the required energy for the marine drive operating at the actual demand.

In certain examples, the control system is configured to receive a safety reserve and to determine the required energy for operating the marine drive at the actual demand such that at least the safety reserve remains in the remaining energy when the marine vessel reaches the destination.

In certain examples, the marine drive is an electric marine drive and the energy source includes a battery.

It should be recognized that the different aspects described throughout this disclosure may be combined in different manners, including those than expressly disclosed in the provided examples, while still constituting an invention accord to the present disclosure.

Various other features, objects and advantages of the disclosure will be made apparent from the following description taken together with the drawings.

BRIEF DESCRIPTION OF THE DRAWINGS

The present disclosure is described with reference to the following Figures.

DETAILED DISCLOSURE

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible.

The present inventor has recognized that marine propulsion poses additional challenges and concerns as compared to propulsion for land vehicles. This is true of both electric propulsion and propulsion using other energy sources, such as gasoline powered internal combustion engines. One challenge with fuel-based propulsion is that unlike land vehicles, gas stations may be few and far between when operating in a body of water. Likewise, a user cannot simply park a marine vessel and walk to a nearby gas station to return with a can of fuel.

The challenges may be further amplified for electric-based marine propulsion, whereby operators are typically less comfortable due to less familiarity and the inability to carry additional energy reserves onboard (e.g., carrying an extra gas can for emergencies). In short, operators report having increased anxiety when operating electric marine propulsion systems, and particularly may have heightened concerns regarding maintaining sufficient battery power to reach their destination and/or reach shore.

Accordingly, the present inventor has developed the presently disclosed systems and methods for assisting the operator in utilizing the energy source available for operating a marine drive. In particular, the present disclosure describes functions and features to prevent a user from inadvertently or unknowingly running out of energy during operation, and particularly before reaching an intended destination.

Figure 1:
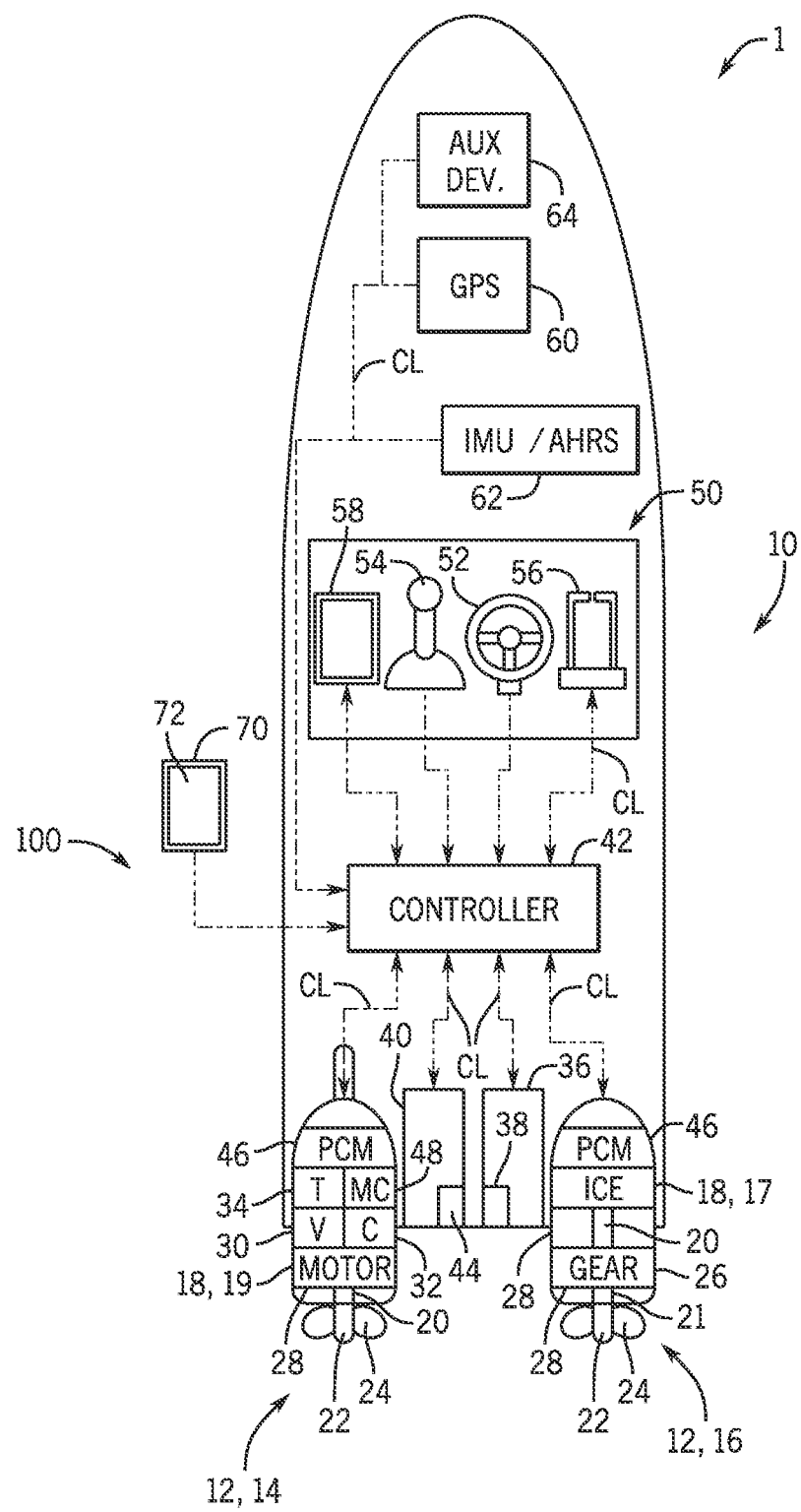
FIG. 1 is a top view of a marine vessel incorporating one embodiment of a propulsion system according to the present disclosure.

FIG. 1 depicts an example of a marine propulsion system 10 for a marine vessel 1 according to the present disclosure, which is configured to propel the marine vessel in a direction instructed by an operator via a steering control system, or by a guidance system configured to automatically control steering of the marine vessel to steer the vessel toward a predetermined location or global position. The marine vessel 1 may be steered in a conventional manner, such as by controlling a marine drive or a rudder via a steering actuator. Additional information regarding exemplary steering actuators is provided in U.S. Pat. Nos. 7,150,664; 7,255,616; and 7,467,595, which are incorporated by reference herein.

The marine propulsion system 10 includes at least one marine drive 12 configured to propel the marine vessel 1 through the water. For demonstration purposes, the present marine vessel 1 is shown to have two different marine devices 12, specifically an electric marine drive 14 steerable by a tiller handle 15 with a throttle grip, and a gasoline powered marine drive 16 (e.g., steerable by conventional steering actuators). While the marine drives 12 are shown as outboard motors, these could instead be inboard motors, stern drives, pod drives, and/or jet drives. Each marine drive 12 includes a powerhead 18. The powerheads 18 may be internal combustion engines (ICE) 17 (e.g., gasoline or diesel engines, gasoline for the gasoline powered marine drive 16), electric motors 19 (e.g., for the electric marine drive 14), and/or a hybrid thereof. Examples of powerheads 18 for electric marine drives include, for example, a brushless DC motor, a DC brushed motor, an AC brushless motor, a direct drive, a permanent magnet synchronous motor, an induction motor, or any other device that converts electric power to rotational motion. In certain embodiments, the powerheads 18 include a rotor and a stator in a known configuration.

Each powerhead 18 has a drive shaft 20 that rotates during operation. Each drive shaft 20 is connected in a torque-transmitting relationship with a propeller shaft 22 that rotates a propeller 24 connected thereto. In this manner, each powerhead 18 rotates a corresponding propeller 24 to generate thrust in the water. As will be known to one of ordinary skill in the art, the propeller 24 may include one or more propellers, impellers, or other propulsor devices and that the term "propeller" may be used to refer to all such devices.

In certain configurations, the drive shaft 20 of the powerhead 18 is connected to the propeller shaft 22 via a gear system 26 or transmission. In this case the gear system 26 or transmission receives rotation from the drive shaft 20 as an input and selectively rotates an output shaft 21 as an output. In particular, the gear system 26 is operable to adjust conversion of the rotation and/or to disconnect the propeller shaft 22 from the drive shaft 20 therethrough, as is sometimes referred to in the art as a "neutral" position in which rotation of the drive shaft 20 is not translated to the propeller shaft 22. The gear system 26 may also shift between "forward" and "reverse" positions, which changes the direction in which the propeller shaft 22 is caused to rotate by rotation of the drive shaft 20. Various gear systems 26, or transmissions, are well-known in the relevant art. In other examples, the powerhead may directly connect to the propeller shaft 22 such that rotation of the drive shaft 20 is directly transmitted to the propeller shaft 22 at a constant and fixed ratio (e.g., for an electric marine drive 14). Shifting a marine drive 12 from neutral to either forward or reverse, or to begin generating propulsion generally, may also be referred to as "engaging" the marine drive 12. Likewise, disengaging the marine drive 12 corresponds to causing the marine drive 12 to no longer generate propulsion, such as by stopping rotation of the powerhead 18 and/or transitioning into a neutral position.

With continued reference to FIG. 1, the marine drives 12 further include powerhead sensors measuring various aspects of the powerheads 18, including a speed in which a powerhead 18 is operating. In certain examples, the powerhead sensors are speed sensors 28 that measure a rotational speed of the drive shaft 20, the output shaft 21, and/or the propeller shaft 22. The shaft rotation sensor 28 may be a Hall-Effect sensor or another rotation sensor that measures the rotational speed in rotations per minute (RPM) in a manner known in the art (e.g., using capacitive or inductive measuring techniques).

Other examples of powerhead sensors, particularly in the case of an electric marine drive 14, include a voltage sensor 30, a current sensor 32, and/or a torque sensor 34 configured to sense an input voltage to the electric motor 19, an input current to the electric motor 19, and a torque output of the electric motor 19, respectively. Accordingly, power delivered to the electric motor 19 can be calculated based on the measurements of the voltage sensor 30 and the current sensor 32. In certain examples, one or more of the parameters, such as the speed, torque, or power to the electric motor 19, may be calculated based on other measured parameters or characteristics of the various sensors. For example, the torque may be calculated based on power characteristics in relation to the rotation speed of the electric motor. As will be discussed further below, these measurements and calculations can then be used for monitoring and controlling the marine propulsion system 10, including for monitoring and controlling the powerheads 18.

The marine drives 12 are connected so as to receive energy from one or more energy sources. In the case of a gasoline powered marine drive 16, the energy is gasoline and the energy source is a fuel tank 36 fluidly connected to the ICE 17 in a conventional manner. A fuel level sensor 38 is configured to measure the amount of fuel remaining in the fuel tank 36 in a conventional manner (e.g., a Hall effect sensor that measures a position of a float within the fuel tank 36).

In the case of an electric marine drive 14, the energy is electrical power, and the energy source is a power storage system 40. The power storage system 40 stores electrical energy for powering the electric motor 19 and is rechargeable, such as by connection to shore power. Various power storage devices and systems are known in the relevant art. The power storage system 40 may be a battery system including one or more batteries or banks of batteries. For example, the power storage system 40 may include one or more lithium-ion (LI) battery systems, each LI battery comprised of multiple battery cells. In other embodiments, the power storage system 40 may include one or more lead-acid batteries, fuel cells, flow batteries, ultracapacitors, and/or other devices capable of storing and outputting electric energy.

The amount of energy available within the energy source for operating the marine drives 12 may also be referred to as the "remaining energy". By way of example, this may be measured in kilowatt-hours, amp-hours, or other electrical measures in the case of electrical energy stored in energy sources, and/or as a volume such as liters or gallons in the case of energy stored in fuel tanks 36. It should be recognized that these measures may also be represented in other forms or units, such as a portion of maximum capacity (e.g., state of charge such as 55% charge remaining, 40% of fuel remaining), in terms of time or "time to empty" at a given energy consumption (e.g., 15 minutes remaining), distance or "distance to empty" at a given energy consumption (e.g., 2.5 miles remaining) or other measures relating to the amount of energy that remains within the energy source for use by the marine drives 12. Techniques for determining the remaining energy of electrical and fuel-based energy sources are well-known in the art and thus not described further here.

With continued reference to FIG. 1, a control system 100 controls the marine propulsion system 10, wherein the control system 100 may include a plurality of control devices configured to cooperate to provide the method of controlling the marine propulsion system described herein. For example, the control system 100 includes a central controller 42, a battery controller (BC) 44, a propulsion control module (PCM) 46, and one or more motor controllers 48, trim controllers, steering controllers, etc. The different controllers 44, 46, 48, 42 and may be communicatively connected via communication links CL, which may be as a communication bus such as a CAN bus or a LIN bus, or by single dedicated communication links between components. A person of ordinary skill in the art will understand in view of the present disclosure that other control arrangements could be implemented and are within the scope of the present disclosure, and that the control functions described herein may be combined into a single controller or divided into any number of a plurality of distributed controllers that are communicatively connected. In certain embodiments, the controller 42, battery controller 44, and PCM 46 are contained entirely within the marine drive itself (e.g., an electric marine drive).

Each controller may comprise a processor and a storage device, or memory, configured to store software and/or data utilized for controlling and or tracking operation of the electric propulsion system 2. The memory may include volatile and/or non-volatile systems and may include removable and/or non-removable media implemented in any method or technology for storage of information. The storage media may include non-transitory and/or transitory storage media, including random access memory, read only memory, or any other medium which can be used to store information and be accessed by an instruction execution system, for example. An input/output (I/O) system provides communication between the control system 100 and peripheral devices.

In certain embodiments, various sensing devices 28, 30, 32, 34, 38, and/or 44 may be configured to communicate with a local controller, such as the motor controller 48, a propulsion control module PCM 46, or battery controller 44. In other embodiments, the various sensing devices 28, 30, 32, 34, and/or 38 may communicate with the central controller 42, which may permit eliminating one or more local controllers. In the example of FIG. 1, the voltage sensor 30 and the current sensor 32 may be communicatively connected to the motor controller 48 to provide measurement of the voltage supplied to the motor and current supplied to the electric motor 19. The motor controller 48 is configured to provide appropriate current and or voltage to meet the demand request for controlling the electric motor 19. For example, a demand input may be received at the motor controller 48 from the central controller 42 (shown here via a propulsion control module 46) such as based on an operator demand at a helm input device. The motor controller 48, voltage sensor 30, and current sensor 32 may be integrated into a housing of the electric motor 19. In other embodiments, the motor controller 48 may be separately housed, as well as the propulsion control module 46.

Each electric motor 19 may be associated with its own motor controller 48 configured to control power to the electric motor, such as to the stator winding thereof. The motor controller 48 is configured to control the function and output of the electric motor 19, such as controlling the torque outputted by the motor, the rotational speed of the electric motor 19, as well as the input current, voltage, and power supplied to and utilized by the electric motor 19. In one arrangement, the motor controller 48 controls the current delivered to the stator windings via leads connected to the electric motor 19, which input electrical energy to the electric motor to induce and control rotation of the rotor.

The power storage system 40 may further include a battery controller 44 configured to monitor and/or control aspects of the power storage system 40. The battery controller 44 may further be configured to receive information from current, voltage, and/or other sensors within the power storage system 40, such as to receive information about the voltage, current, and temperature of each battery cell or group of battery cells within the power storage system 40. For example, the battery controller 44 may receive inputs from one or more sensors within the power storage system 40, such as one or more voltage, current, and temperature sensors within a housing for the power storage system 40. As described above, voltage sensors 30 may be configured to sense voltage within the battery (such as cell voltage sensors configured to sense the voltage of individual cells or groups of cells in a LI battery) and one or more temperature sensors may be configured to sense a temperature within a housing of the power storage system 40 where one or more batteries or other storage elements are located. The battery controller 44 or other controller in the system is configured to calculate a charge level, such as a state of charge, of the power storage system 40.

With continued reference to FIG. 1, additional components are also provided in communication with the control system 100, each of which may function as an input thereto and/or output thereof. In the example shown, the controller 42 also receives input from and/or communicates with one or more user interface devices within a user interface system 50 via the communication links CL, which in some embodiments may be the same communication link as utilized for communication between the controllers 44, 46, 48, or may be a separate communication link. The user interface devices 50 in the exemplary embodiment include a steering wheel 52, a joystick 54, throttle levers 56, and a display device 58.

The steering wheel 52 and joystick 54 may be configured to receive user inputs in a conventional manner, which subsequently may communicate with the controller 42 to effectuate steering control over the marine vessel 1, such as by steering one or more marine drives 12, which is well-known and typically referred to as steer-by-wire arrangements. Other steer arrangements, such as steering cable systems arrangements, are well-known in the art and could alternatively be implemented.

Likewise, the throttle levers 56 may be configured to receive user inputs in a conventional manner (also referred to as receiving a requested speed or a demand request), including both a magnitude and a direction for generating thrust, which may be subsequently communicated with the controller 42. In particular, the throttle levers 56 may communicate with the controller 42 to effectuate control of the output of the powerheads 18 of the one or more marine drives 12, which is well-known and typically referred to as a throttle-by-wire arrangement. By way of example, rotating one of the throttle levers 56 in a forward direction away from its neutral, detent position could be interpreted as a value from 0% to 100% demand request that corresponds, via an input/output map such as a look up table, to control the output of the powerhead 18 for the corresponding marine drive 12. In the case of a gasoline powered marine drive 16, rotating the throttle lever 56 may effectuate control a throttle valve position (and in certain examples, the transmission being shifted for rotating the propeller in the forward direction). This may occur through communication between the central controller 42 and a propulsion control module 46. In the case of an electric marine drive 14, rotating the throttle lever 56 may effectuate control of how much power is provided to the electric motor 19 rotating in the forward direction. This may occur through communication with a motor controller 48 and/or propulsion control module 46.

The input/output map may provide that no power is provided to the electric motor 19, or that the throttle valves are closed to an idle position, when the throttle lever 56 is in the neutral, detent position (i.e., 0% demand request). Likewise, maximum power may be provided to the electric motor 19, or the throttle valves being fully open, when the throttle lever 56 is pushed forward to its furthest extent (i.e., 100% demand request). It should be recognized that the throttle lever 56 being pushed backwards to its furthest extent (e.g., −100% demand request) responds oppositely, generating a corresponding thrust in an opposite direction (which may involve shifting the transmission in a conventional manner).

The present disclosure also contemplates alternate configurations, such as marine drives having tiller handles for controlling steering and throttle (and in either electric, fuel-based, or hybrid configurations). Likewise, demand requests may be received other than from throttle levers or grips, for example from cruise control or auto-pilot operational modes known in the art.

The display device 58 is configured to display information for the user, as well as to receive input commands relating to steering, thrust, and/or other functions of the marine vessel and/or marine drive. This includes the programming of destinations and waypoints for autopiloting. In particular, the display device 58 may be a multi-functional display device permitting touchscreen inputs from the user. It should be recognized that other input devices may also be provided, such as keyboards, trackpads, roller balls, and the like. In various embodiments, the display device 58 may be, for example, part of an onboard management system, such as the VesselView™ by Mercury Marine of Fond du Lac, Wisconsin.

The onboard management system may also or alternatively be controlled through an external device 70 that wirelessly communicates with the controller 42, such as a tablet or smartphone communicating via wireless protocols known in the art (e.g., Wi-Fi or Bluetooth®). The external device 70 may have a processor, storage device, and an input/output (I/O) system in the same manner as other controllers discussed above. The processor may be configured to execute an application stored in the storage device that enables the user to receive information from the controller 42 relating to the marine drives 12 and the marine vessel 1 more generally, to input a destination for propelling the marine vessel, and to provide input commands to the controller 42 for controlling the marine drives 12 and the marine vessel 1 more generally. By way of example, the external device 70 may be configured to operate an application such as the "Mercury Marine" App or the VesselView™ Mobile App each provided by Mercury Marine of Fond du Lac, Wisconsin. In each case, the applications allow the user to receive information and to provide input commands via a user interface 72 of the external device 70, such as via a touchscreen. In this manner, the external device 70 may also constitute a controller within the control system 100.

Other components may also communicate with the controller 42, such as a GPS system 60 configured to determine a current global position of the vessel, track vessel position over time, and/or determine vessel speed and direction of travel and to provide this information to the controller 42. Alternatively, or additionally, vessel speed may be measured by a speed-over-water sensor such as a pitot tube or a paddle wheel and such information may be provided to the controller 42. This communication may again be provided via CAN bus, LIN bus, or single dedicated communication links).

The marine vessel 1 may also include an inertial measurement unit (IMU) or an attitude and heading reference system (AHRS) (collectively shown as the IMU/AHRS 62). An IMU has a solid state, rate gyro electronic compass that indicates the vessel heading and solid-state accelerometers and angular rate sensors that sense the vessel's attitude and rate of turn. An AHRS provides 3D orientation of the marine vessel 1 by integrating gyroscopic measurements, accelerometer data, and magnetometer data. The IMU/AHRS 62 could be GPS-enabled, in which case a separate GPS system 60 would not be required. The IMU/AHRS 62 may communicate with the controller 42 in a similar manner to the GPS system 60.

In addition to the electric marine drive 14, the GPS 60, the IMU/AHRS 62, and other electrical devices are also powered by the power storage system 40. In particular, the power storage system 40 may further be configured to power auxiliary devices 64 on the marine vessel 1 that are not part of the marine propulsion system 10. For example, the auxiliary devices may include a bilge pump, a cabin light, a stereo system or other entertainment devices on the vessel, a water heater, a refrigerator, an air conditioner or other climate/comfort control devices on the vessel, communication systems, navigation systems, or the like. Some or all of these accessory devices are sometimes referred to as a "house load" and may consume a substantial amount of battery power.

As discussed above, the present inventor has recognized new methods for assisting users in managing the remaining energy of a limited energy source to ensure that the marine vessel can reach its destination, alleviating range anxiety. While this range anxiety may be particularly pronounced in the case of electric propulsion, the presently disclosed systems and methods also advantageously assist users with energy management for fuel-based propulsion.

The range that a given amount of remaining energy can propel a marine vessel is greatly dependent upon the speed of the marine vessel in the water. Specifically, the energy required to propel the marine vessel in water is greatly dependent on the marine vessel's drag through the water, which is dependent on speed. This includes whether the marine vessel is planing, whereby drag is greatly reduced by having less hull in the water. Additionally, and notably, the speed of the marine vessel greatly impacts drag even when not planing. In particular, drag increases exponentially as speed increases (e.g., drag=velocity$^2$). Therefore, the drag when propelling a marine vessel through the water at 4 mph is four times greater than at 2 mph, therefore requiring four times the energy for the marine drives to propel the marine vessel.

Through experimentation and development, the present inventor has developed systems and methods for automatically controlling a marine drive to ensure that the marine vessel can reach its destination without running out of energy, particularly by recognizing the impact of speed on required marine drive output. As will become apparent, this is enabled by configuring the marine propulsion system 10 and the control system 100 to receive a destination for propelling the marine vessel and a remaining distance thereto, an amount of remaining energy available for operating the marine drive, a power output of the marine drive, and the speed of the marine vessel, and to control the output of the marine drive or drives to reach the destination. As will also become apparent, this means that under certain circumstances the actual demand for operating the marine drive or drives (e.g., the motor torque, motor current, engine speed, etc.) may differ from the demand request for operating the marine drive or drives, such as may be provided by a throttle lever. This solution is unique to marine vessels. In the automotive space, there are minimum highway speeds and other problems with operating at reduced speeds. In aerospace, airplanes must maintain a minimum air speed to remain flying.

Figure 2:
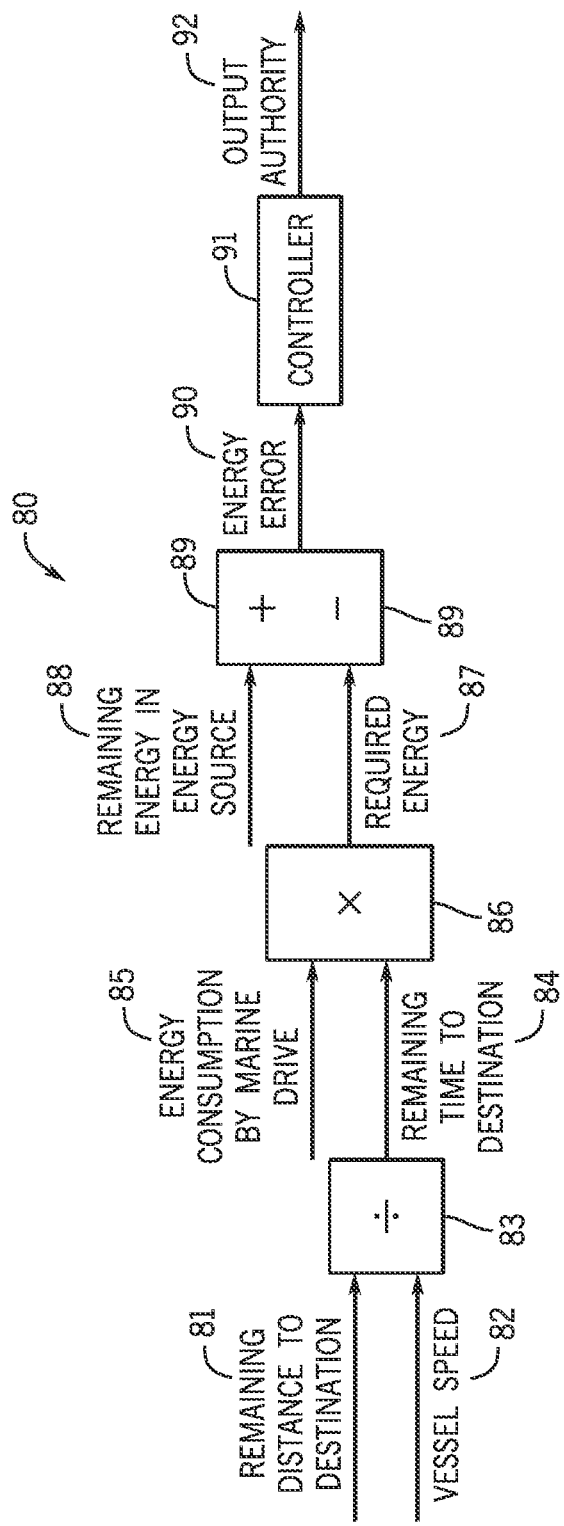
FIG. 2 shows an example of a control routine for controlling a marine drive according to the present disclosure.

The control diagram at FIG. 2 illustrates an exemplary control routine 80 executed by the control system 100 for controlling the marine propulsion system 10. For simplicity, much of the description herein will specifically refer to controlling one marine drive, though it should be recognized that the marine propulsion system 10 may include more than one being simultaneously controlled (whether the same, or in a different manner than each other). The remaining distance 81 to the destination and a vessel speed 82 are received as inputs to the control routine 80. The remaining distance 81 represents the distance that the marine vessel must still be propelled to reach the pre-set destination without recharging the power storage system 40. By way of example, the remaining distance 81 may be received from the conventional mapping software or be calculated by comparing a current GPS location of the marine vessel to the destination location. The vessel speed 82 may be received from the GPS system or other speed sensors such as those discussed above. In certain examples, the remaining distance 81 may be provided in miles and the vessel speed 82 may be provided as miles per hour.

The inputs and outputs of the control routine 80 may also be subjected to further processing, including filtering (e.g., first-order filtering), moving averages, and the like for the purpose of smoothing out the data to accommodate for momentary variation.

Calculation function 83 is executed to determine a remaining time 84 for the marine vessel to reach the destination based on the current distance and vessel speed. In the example above, the remaining time 84 is provided in hours. It should be recognized that in certain embodiments the remaining time 84 may alternatively be provided directly from the conventional mapping software rather using than the calculation function 83.

The energy consumption of the marine drive 85 is also provided as an input to the control routine 80. In the example of an electric marine drive, the energy consumption may be provided from a motor controller in kilowatt hours (kWh) in a conventional manner (e.g., as a power draw value or the product of a current draw value and a voltage measurement value measured for the electric motor, per hour). In the case of a fuel-based marine drive, the energy consumption may be in units of gallons per hour determined in a conventional manner (e.g., based on the RPM of the powerhead, positions of throttle valves, torque sensors, and/or other techniques).

Calculation function 86 determines the required energy 87 for the marine vessel to reach the destination based on the energy consumption, specifically as the product of the remaining time and the energy consumption of the marine drive. It should be recognized that units of power or energy may also be converted as needed between electricity and fuel-based sources using the U.S. Environmental Protection Agency's estimation that 33.7 kWh of electricity is equivalent to one gallon of gasoline.

The remaining energy 88 within the energy source is also received as an input to the control routine 80. This remaining energy 88 may be received from a battery controller in a conventional manner, for example being represented as the remaining kilowatt-hours of energy stored in a battery. In the case of a fuel-based marine drive, this may be the remaining fuel measured in the fuel tank in a conventional manner (e.g., gallons). As discussed above, the remaining energy 88 may be filtered as with the other inputs and outputs of the control routine 80. It should further be recognized that the units for each of the exemplary inputs and outputs may vary from that expressly discussed herein (e.g., the remaining energy may be represented in amp hours with appropriate conversions to be used in calculations with other variables).

Calculation function 89 determines the difference between the remaining energy 88 and the required energy 87, represented as the energy error 90. The energy error 90 is input to a controller 91, which may be a controller discussed above or another controller within the overall control system 100 (e.g., a separate power controller). In certain examples, a conventional PID controller may be used as the controller 91. In certain examples using PID controllers, the controller may be configured to not provide proportional control, but rather incremental control as described herein.

The controller 91 outputs an output authority 92 based on the energy error 90. When the energy error 90 is a positive value (i.e., the remaining energy 88 exceeds the required energy 87 to reach the destination), full power authority is provided for controlling the marine drive. In other words, the marine drive is controlled such that the actual demand of its operation is equal to the demand request thereof. In certain examples discussed further below, if the authority for controlling the marine drive had been previously limited or reduced, a positive value fed to the controller 91 may result in the controller 91 increasing the output authority 92 to or towards full authority.

In contrast, when the energy error 90 is negative (i.e., the remaining energy 88 is insufficient for the marine vessel to reach the destination based on the required energy 87 to do so under current conditions), the controller 91 iteratively adjusts the output authority 92 to limit the user authority over propulsion, conserving energy as necessary to enable the marine vessel to reach the destination. The process is repeated until the energy error is positive (or in certain examples, zero), indicating sufficient remaining energy to reach the destination. In other words, the user's output authority 92 is iteratively reduced until there is sufficient electrical power and/or fuel to propel the marine vessel to the destination.

The output authority 92 may be generated as an adjustment or imposed limit on a motor speed, a motor torque, a motor current, a motor power, a vessel speed, or a helm demand, each relative to the previous value for operating the marine drive. In various embodiments, the output authority may be effectuated as a maximum value that sets a limit for the rate of power consumption by the motor, such as a maximum motor torque, a maximum motor speed (RPM), a maximum motor current or motor power consumed by one or more electric motors in the propulsion system, a maximum demand instruction permitted, a maximum vessel speed, or the like. In various embodiments, the output limit may be automatically effectuated by the control system on the marine vessel such that the propulsion system, and particularly the motor, is controlled so as not to exceed the output limit.

In certain embodiments, if the controller 91 is configured to increase or decrease the output authority 92 by a set amount of 3% of actual demand (based on whether the energy error 90 is positive or negative, respectively), the marine drive is being requested to operate according to a 100% demand request, and the energy error is negative, the controller 91 would limit the authority by 3% such that the actual demand of the marine drive is controlled as if the demand request were 97% (despite the throttle lever still corresponding to a demand request of 100%). Since the process is iterative, the output controller 91 will keep incrementally decreasing the output authority 92 by an additional 3% until the energy error 90 is positive (or in certain embodiments, zero). It should be recognized that other units may be used for the set amount of adjusting the marine drive operation, such as wattage, RPM, and/or the like.

In certain embodiments, the control routine 80 is configured to leave a buffer of safety reserve of remaining energy expected to remain when the marine vessel reaches the destination. For example, the safety reserve may be 10% of battery capacity or 10% fuel remaining within the fuel tank. In this case, the calculation function 89 may be performed as the remaining energy 88, less the 10% safety reserve, less the required energy 87. This would provide that the controller 91 iteratively reduces the output authority 92 when the energy source would have less than 10% remaining when the marine vessel reaches the destination.

Figure 3:
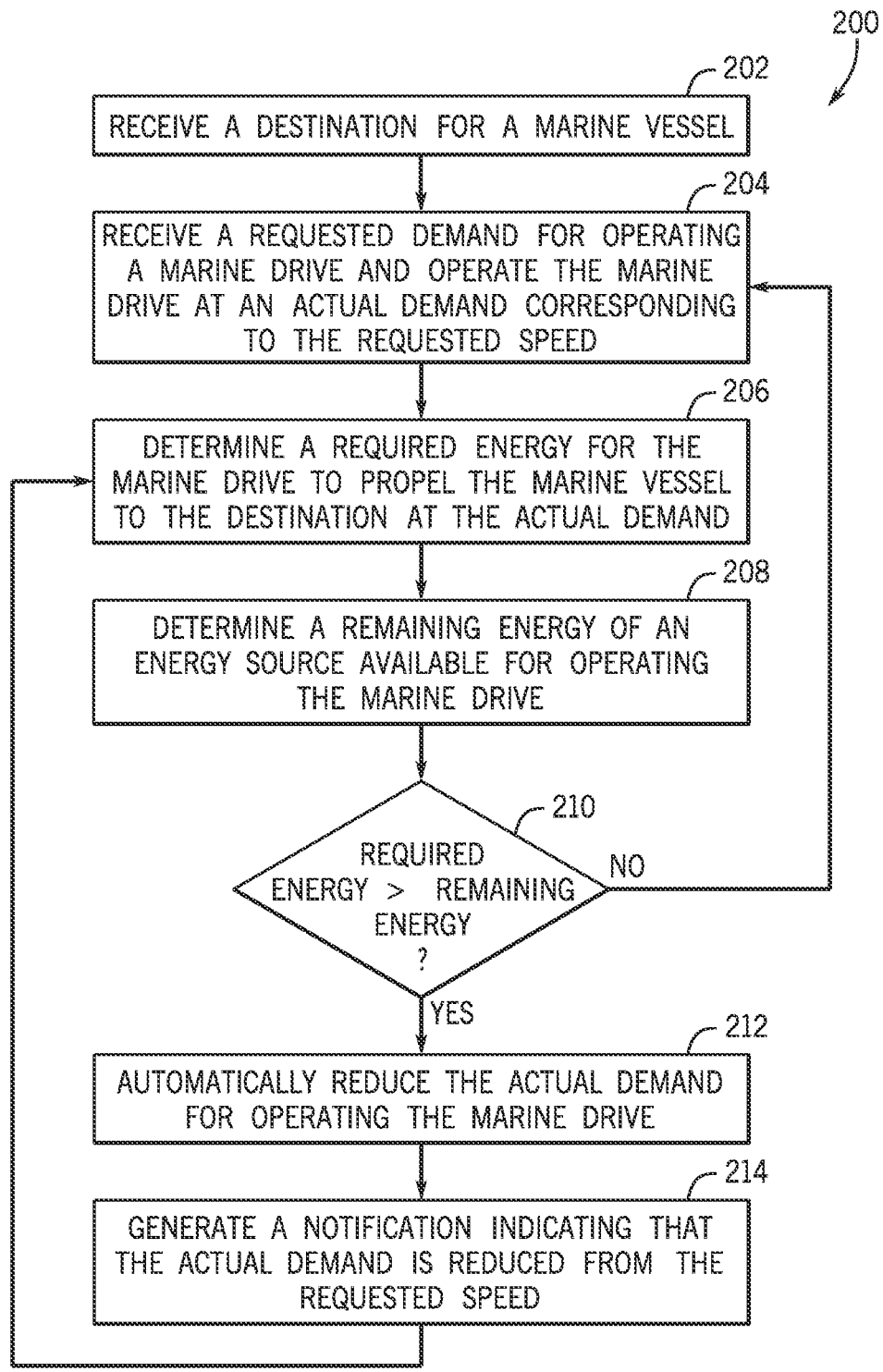
FIG. 3 is a flow chart showing a method for controlling a marine drive according to the present disclosure.

FIG. 3 disclosed one method 200 for controlling a marine drive to propel a marine vessel according to the present disclosure. Step 202 provides for receiving a destination for the marine vessel, which may be entered via the display device 58 at the helm and/or an external device 70 in a manner known in the art (e.g., using Mercury Marine or VesselView™ Apps as described above). By way of example, the destination may be selected by touching a geographic destination of interest on a touchscreen display of a map, entering an address, or choosing a favorite location stored in memory. The destination may also be selected from the results of searching map locations stored in memory, such as the user searching for a nearby fueling or charging station, marina, or restaurant.

Step 204 provides for receiving a demand request for operating the marine drive and operating the marine drive at an actual demand corresponding to the demand request. As discussed above, the user may input a demand request via a position of a throttle lever, rotating a tiller handle throttle grip, or selecting auto-pilot settings (e.g., via one of the display devices). The subsequent control of the marine drive to operate at an actual demand corresponding to that demand request may be performed in a manner known in the art, such as communicating the corresponding power level to a motor controller or communicating with a propulsion control module to position a throttle valve accordingly.

In step 206, the required energy to propel the marine vessel to the destination at the actual demand in which the marine drive is being operated is determined. This may be performed in the manner described above for determining the required energy 87 in the control routine 80 of FIG. 2. The required energy may alternatively be determined in a manner known in the art, which may be in a different form than that described above. For example, the required energy may be provided as the "distance to empty" or the "time to empty" at the marine drive's current energy consumption. For example, the current energy consumption may be determined by the motor controller and/or may be calculated based on the voltage sensed by the voltage sensor and the current sensed by the current sensor associated with the electric motor. Additional information is provided in U.S. patent application Ser. Nos. 17/574,303 and 17/574,284. Known calculation methods may also be used for determining the current energy consumption for fuel-based marine drives, such as by monitoring the position of throttle valves and/or the RPM of the drive shaft or the propeller shaft.

The current energy consumption (e.g., watts, gallons/hr, or gallons/mile) can then be used to determine the required energy to reach the destination by multiplying with the remaining time or distance to the destination at the current speed, as the case may be. It should be recognized that determining the remaining time or distance to the destination is well-known and thus not described further herein. Therefore, in the example of a current energy consumption of 0.7 kilowatt (kW) and a remaining time to destination of 0.4 hrs, the required energy for the marine drive to propel the marine vessel to the destination at the current speed would be 0.7 kW×0.4 hrs=0.28 kWh. In other words, the energy source would need to provide an estimated 0.28 kWh of energy to the marine drive to propel the marine vessel to the destination at the current speed and under current conditions.

For a fuel-based marine drive, a consumption rate of 0.5 gallons/hr with a remaining time to destination of 0.4 hrs would provide for a required energy of 0.5 gal/hr×0.4 hr=0.2 gallons. Likewise, if the destination is provided as a measure of remaining distance, for example 2 miles remaining, and the consumption rate is determined to be 0.3 gallons/mile, the required energy would be 0.3 gal/mile×2 miles=0.6 gallons for the marine drive to propel the marine vessel to the destination.

It should be recognized that the required energy may vary over time even where no changes are made to the demand request of the marine drive. For example, the current in the water may change, wind and waves may change, and/or the loading within the marine vessel may change, resulting in a different determined value of the current energy consumption at that time. As will become apparent, iteratively controlling the marine drive advantageously accommodates for these changes.

With continued reference to the method 200 of FIG. 3, step 208 provides for determining a remaining energy available within the energy source. This may be determined by the motor controller in a manner known in the art, such as being provided as a state of charge for a battery or a fuel level within the fuel tank. By way of example, a 46% state of charge for a 1 kWh battery provides that 0.46 kWh of power remains in the energy source. Likewise, a reading of the fuel tank being 46% full, with a total capacity of 5 gallons, provides for 2.3 gallons of remaining energy in the energy source.

In step 210, the remaining energy as determined in step 208 is compared to the required energy to propel the marine vessel to the destination under current conditions as determined in step 206. If the required energy does not exceed the remaining energy, in certain embodiments subject to a threshold serving as a buffer (e.g., a 10% safety reserve), there is sufficient energy remaining for the marine vessel to reach the destination. As such, the method returns to step 204 to continue monitoring the available and required energy. In the meantime, the marine drive may continue to be operated such that the actual demand corresponds to the demand request provided by the user, or as previously reduced.

If instead the required energy is found to exceed the remaining energy in step 210, this indicates that there is insufficient remaining energy in the energy source to propel the marine vessel to the destination while operating the marine drive under current conditions. In this case, the method 200 proceeds to step 212, whereby the actual demand for operating the marine drive is automatically reduced. As discussed above, the actual demand may be an RPM in which the powerhead and/or propeller shaft is rotated, an amount of current or power provided to the electric motor, a torque output, or a throttle position, by way of example. It should be recognized that the actual demand for operating the marine drive is reduced despite the demand request (e.g., from the user) not changing, for example with the throttle grip of a tiller handle remaining in the same rotational position. Thus, the automatic reduction in actual demand for operating the marine drive is also referred to as reducing or limiting the output authority as discussed above for the control routine 80 of FIG. 2.

In certain embodiments, the method 200 continues to step 214, which is discussed further below. In other embodiments that do not include an optional step 214, the method 200 instead returns to step 206 after step 212, whereby the process of reducing the actual demand may repeat iteratively as necessary until the required energy no longer exceeds the remaining energy (in some cases subject to thresholds or safety reserves, as discussed above).

Through experimentation and development, the present inventor has identified that the approach of monitoring the remaining and required energy and making iterative adjustments to the output authority as needed is particularly advantageous over other methods of managing power known in the art. In particular, the conditions impacting the marine drive's ability to propel the marine vessel to the destination may be ever-changing. By way of example, this includes changes in current, in the direction in which waves are encountered, in the loading of the marine vessel, and other variations. Batteries as the energy source may also not provide consistent, linear output. Accordingly, a non-iterative approach to reducing energy consumption may reduce the output authority more than necessary to reach the destination, or may be insufficient to reach the destination under certain conditions. Moreover, an iterative approach allows the system to return output authority as possible. For example, an amount of safety reserve may vary based on the remaining distance to the destination (e.g., 20% at a remaining distance of 2+ miles, 10% at 1 mile, 5% at 0.5 miles, and 2% at less than 0.5 miles). In this manner, the presently disclosed systems and methods minimally deviate from the user's requested controls while still ensuring that the marine vessel may reach its destination.

Figure 4:
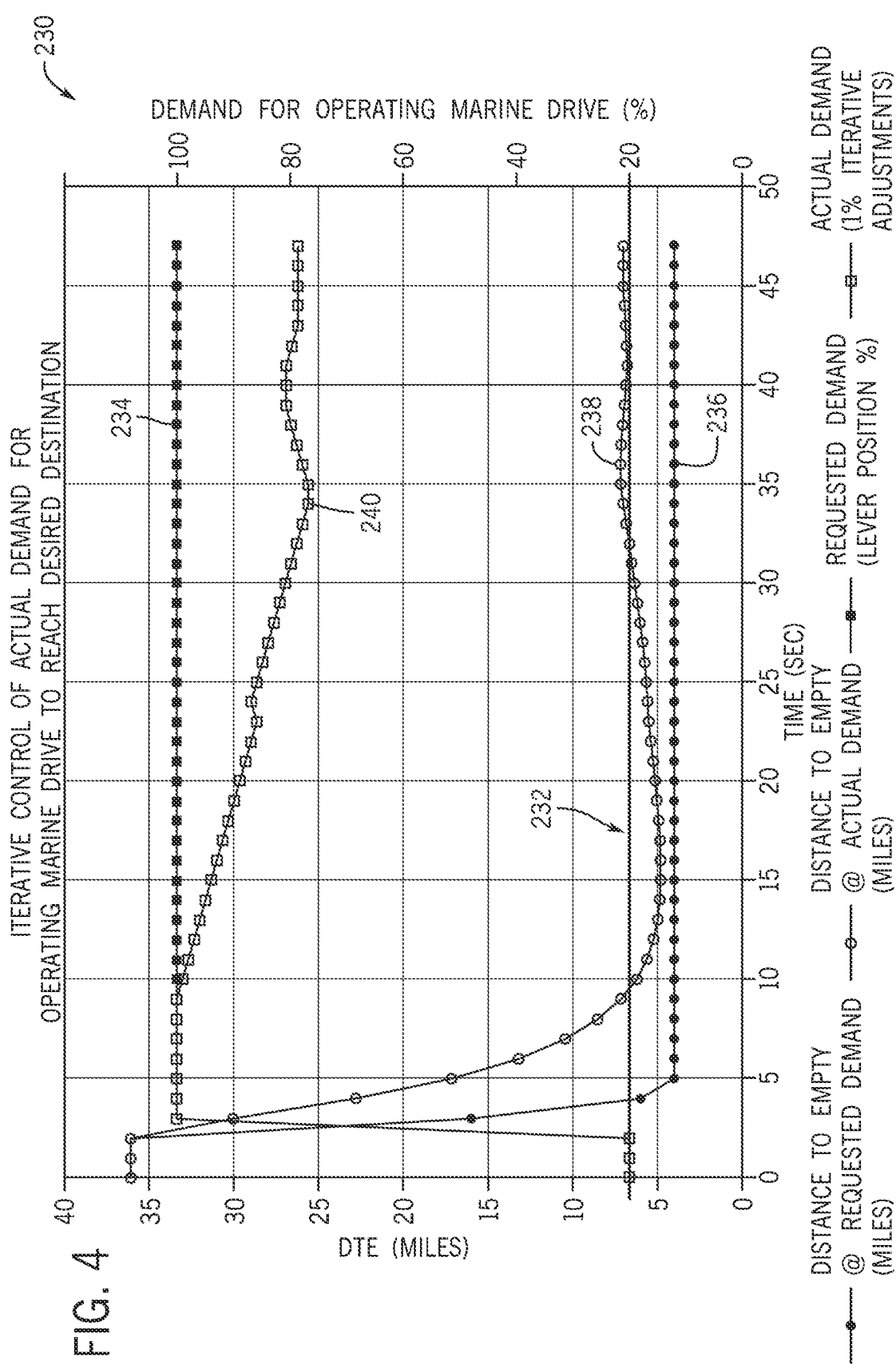
FIG. 4 is a graph showing data corresponding to performing a method for controlling a marine drive according to the present disclosure.

FIG. 4 is a graph 230 showing one example of automatically, iteratively controlling the actual demand for operating a marine drive to reach a destination according to the present disclosure. In the example shown, the remaining distance 232 for the marine vessel to reach the destination is 7 miles. The demand request waveform 234 reflects the demand request received from the user and is shown to increase from about 20% to 100% at a time=3 seconds, such as by a quick rotation of a throttle grip or throttle lever to full ahead. The graph 230 shows the distance to empty waveform 236 calculated based on the demand request waveform 234, which may be received from the propulsion control module or another controller in a manner known in the art and described above. It is apparent that very shortly after the demand request waveform 234 is shown to increase, the distance to empty waveform 236 decreases sharply, caused at least in part by the dramatic increase in drag on the marine vessel at the increased speed. It can be seen that the marine vessel will not be able to reach the destination under the present conditions by comparing the remaining distance 232 to the distance to empty waveform 236, which show the distance to empty waveform 236 indicating an estimated 4 miles rather than the 7 miles required to reach the destination.

In view of this, the actual demand for operating the marine drive is iteratively reduced in a manner described herein, in the present example in 1% increments. In certain embodiments, the system is configured to iteratively adjust based on a filtered version of the distance to empty waveform 236 data. By way of example, the distance to empty waveform 236 or other dataset may be subjected to first-order filtering as follows:

$$\text{Filt}\_n = \text{alpha} * \text{sample} + (1-\text{alpha}) * \text{Filt}\_{n-1}$$

whereby alpha is a filter constant such as 0.3

It should be recognized that a filter constant of 1 would represent no filtering (i.e., all new data), whereas a filter constant of 0 would represent a maximum filter (no new data). It should further be recognized that alternative mechanisms for filtering or averaging data over time are also contemplated by the present disclosure.

Figure 5:
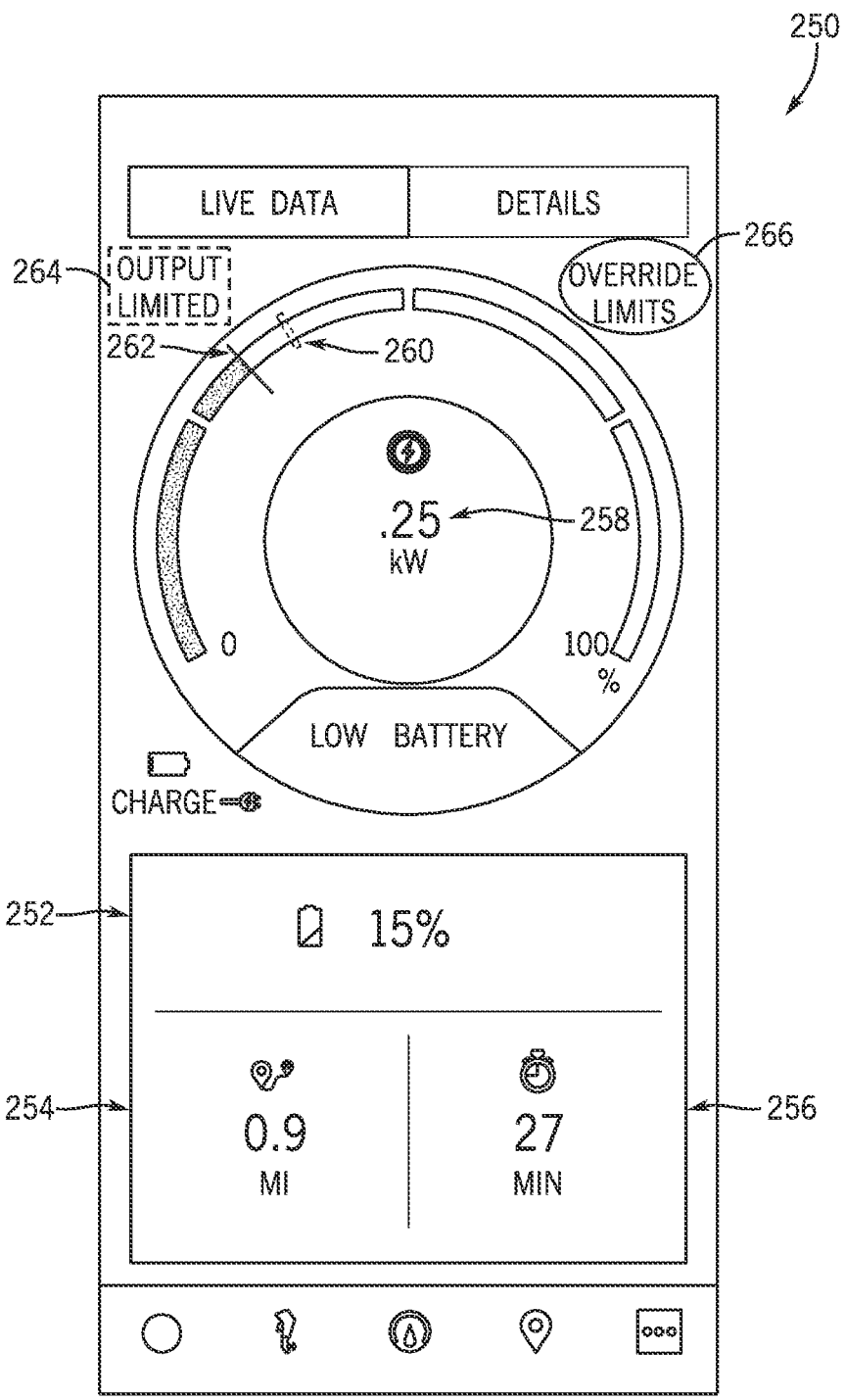
FIG. 5 is a representation of a display for notifying a user according to the present disclosure.

Due to filtering and/or preset delays the system may not immediately adjust the actual demand of the marine drive upon the distance to empty waveform 236 indicating becoming insufficient to reach the destination. In the example of FIG. 5, a distance to empty waveform 238 at the actual demand of the marine drive (shown filtered with a filter constant of 0.3) is monitored and compared to the remaining distance 232 to the destination. As described above, this is akin to determining the energy error between the remaining energy in the energy source and the required energy of operating the marine drive at the actual demand from the exemplary control routine 80 of FIG. 2. Once the distance to empty waveform 238 at the actual demand becomes less than the remaining distance 232 to the destination (shown at approximately time=10 seconds), the system begins to iteratively control the marine drive such that the actual demand 240 no longer corresponds to the demand request waveform 234.

The graph 230 shows a set time period for iteratively adjusting control of the marine drive of 1 second (also referred to as the adjustment rate or frequency for changing the actual demand for operating the marine drive). However, other rates for iteratively adjusting the actual demand are also contemplated. The present inventor has recognized that the optimal adjustment rate may vary on the size of the marine vessel, the actual demand, or other factors that impact how quickly the drag on the marine vessel changes in response to changes in the actual demand. The greater the marine vessel's inertia in the water, the longer the optimal adjustment rate such that the control of the marine drive isn't iteratively adjusted more frequently than the change in the distance to empty can be recognized.

In the certain examples, the actual demand 240 of the marine drive is iteratively reduced in 1% increments each 1 second until the distance to empty waveform 238 at the actual demand exceeds the remaining distance 232. The reduction in actual demand may not be linear since the reductions are iterative and based on constant flows of new data (power received by the motor, vessel speed, state of charge, etc.), which as discussed above may be filtered and the like. As discussed above, another particular advantage of the presently disclosed systems and methods is that the iterative adjustments may go both ways, or in other words, output authority may be restored (i.e., the actual demand increased) when a reduction is determined to be more than necessary. This can be seen at approximately time=34 seconds, whereby the distance to empty waveform 238 at the actual demand once again exceeds the remaining distance 232, resulting in incremental 1% increases in actual demand 240 before being reduced again until settling with the distance to empty waveform 238 being equal to the remaining distance 232 at approximately time=43 seconds.

It should be recognized that the time for the actual demand 240 to settle may be varied by the adjustment frequency and/or the change in actual demand for each control adjustment iteration of the marine drive. It should further be recognized that while the graph 230 shows controlling the marine drive such that the distance to empty waveform 238 at the actual demand is exactly equal to the remaining distance 232, safety reserves may be factored in (e.g., the remaining distance 232 reflecting 10% more than the GPS system actually determines for the marine vessel).

In certain embodiments, the system is configured to only increase the actual demand 240 for operating the marine drive (after having previously reduced the actual demand) when the remaining energy exceeds the required energy by more than a threshold. In other words, the actual demand 240 may not be increased until the distance to empty waveform 238 at the actual demand exceeds the remaining distance 232 by more than a preset amount, such as 3%, 5%, 1 mile, or other measures. This prevents the operation of the marine drive from being changed more often than needed, which may be undesirable for the user Returning to FIG. 3, in certain embodiments the method 200 further includes the optional step 214 of generating a notification indicating that the actual demand is reduced from the demand request. This allows the user to recognize that the output authority has been limited, which in certain conditions may not otherwise be noticeable to the user. By of example, the notification may be provided as an auditory, visual, and/or haptic alert. Examples of these notifications are provided below. The method 200 then returns to step 206 for continued monitoring and subsequent automatic adjustments.

FIG. 5 illustrates an example of display 250 provided via the user interface 72 of an external device 70 (FIG. 1) that wirelessly communicates within the control system 100, for example within the Mercury Marine App by Mercury Marine of Fond du Lac, Wisconsin. The display 250 shows useful data relating to operation of the marine vessel and the marine drive, in this case an electric marine drive. The display 250 shows the remaining energy 252 of the energy source, here as a state of charge, as well as a remaining distance 254 (also referred to as range) and a remaining time 256 to arrive at the pre-selected destination based on the current conditions and operation of the marine drive. The display 250 further shows the actual energy consumption 258 of the marine drive (which may be filtered to smooth out any minor variation), or in other words how much power is being delivered to the electric motor of the electric marine drive from the battery or batteries. The display 250 further shows both a marker 260 for the demand request and a marker 262 for the actual demand of the marine drive, which in this case is displayed as a percentage of the maximum power deliverable to the electric motor for propelling the marine vessel.

As shown, the demand request marker 260 is not the same as the actual demand marker 262, which has been reduced via limiting the output authority in a manner described above. In this manner, the display 250 visually notifies the user that the output of the marine drive has been limited. In certain embodiments, a message 264 is also displayed, which also notifies the user and provides further explanation for why the actual demand marker 262 for operating the marine drive varies from the user's demand request marker 260. In certain embodiments, the actual demand marker 262 and/or the demand request marker 260 markers may flash or otherwise be displayed in a manner to gain the user's attention of the discrepancy between actual and demand requests.

In certain embodiments, if the user were to increase the demand request from that shown, such as by rotating the throttle grip of a tiller handle, the demand request marker 260 would increase along the range between 0% and 100% to reflect the increase in demand request. However, the marine drive would not increase the actual demand since the remaining energy in the energy source cannot support this request while ensuring that the marine vessel reaches the destination. The same is true of reducing the demand request, that is until the demand request marker 260 is at or below the actual demand marker 262. In other words, demand request below the actual demand will cause the marine drive to slow the actual demand until it equals the demand request. In this case, the actual demand marker 262 may be displayed alone and the message 264 may be removed. The system continues monitoring the available and used energy and may make further adjustments as needed, updating the display 250 accordingly.

In certain embodiments, the system is configured to initially respond to changes in the demand request to indicate to the user that the request has been received, but then iteratively adjust the actual demand as needed. In further embodiments, the user may be permitted to override the automatic reduction in the actual demand for operating the marine drive, such as by pressing an override button 266 on the display 250. In further embodiments, the system detects when the marine drive becomes engaged to propel the marine vessel (e.g., from neutral to forward or reverse) and resets the actual demand for operating the marine drive to the demand request when the marine drive becomes engaged (subsequently iteratively reducing as needed).

Figure 6:
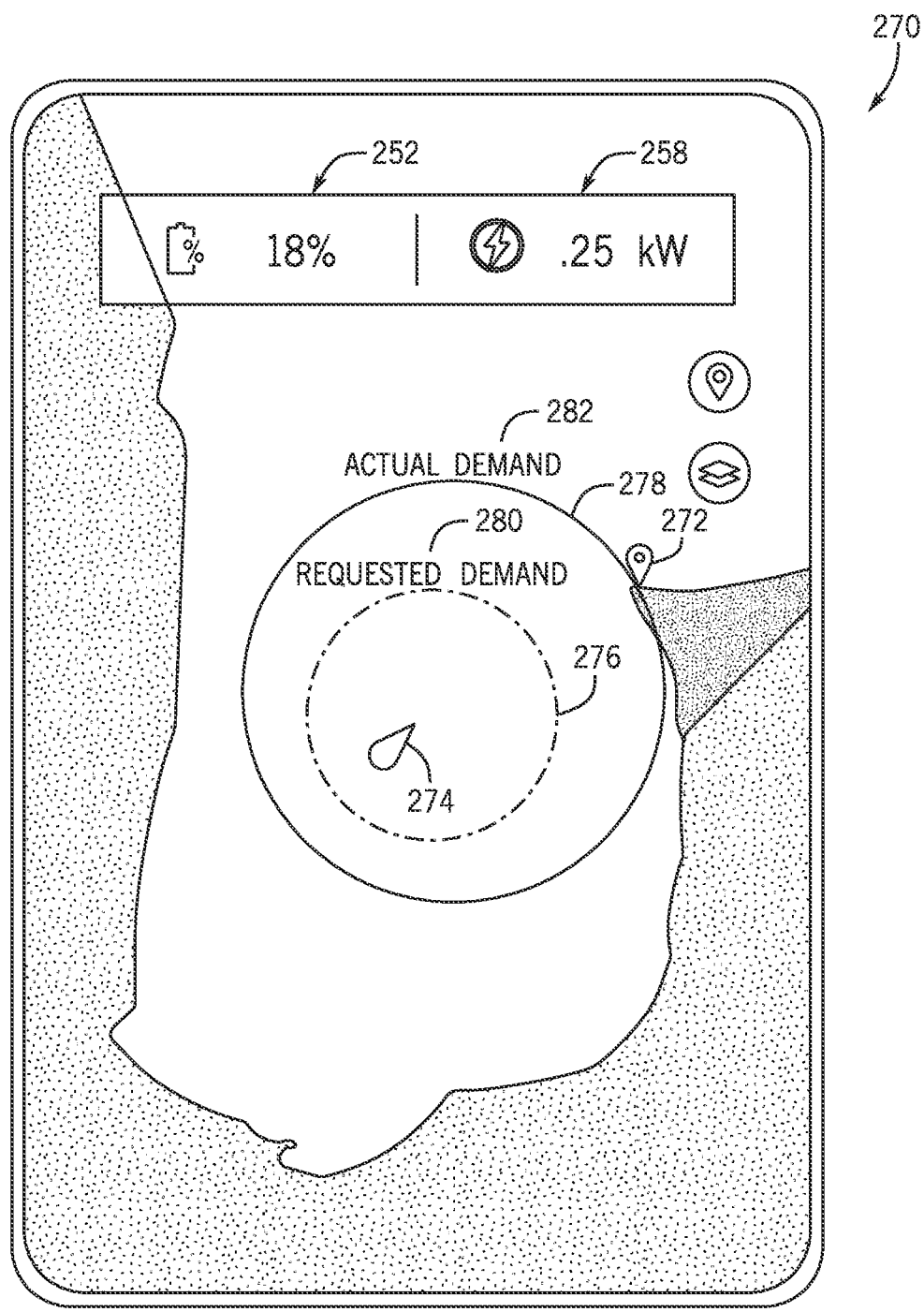
FIG. 6 is a representation of another display for notifying a user according to the present disclosure.

FIG. 6 shows another display 270 of the external device 70 (FIG. 1), this time of a map as may be conventional. The destination is shown via marker 272, along with the position of the marine vessel 274 in the water and other landmarks. The display 270 shows the range in which marine vessel may travel based on the remaining energy in the energy system and the current consumption rate of the marine drive. In particular, the display 270 shows both a first range 276 that the marine vessel may travel at the demand request, and a second range 278 that the marine vessel may travel at the actual demand in which the marine drive is being operated. The first range 276 may be shown in dotted lines or another manner to indicate that this is not the actual range for the marine drive as currently operating (e.g., to coordinate with how the demand request marker 260 is shown in the display 250 of FIG. 5). Each range is also provided with labels 280, 282 to help notify the user of the reduced speed and of the impact this has on range. It should be recognized that in the display 270, the ranges effectively represent the distance to empty or how far the remaining energy will take the marine vessel at the current operating conditions. In certain configurations, such as that shown, the ranges are shown in all directions, rather than only to the destination, which factors in other effects such as current and wind.

Figure 7:
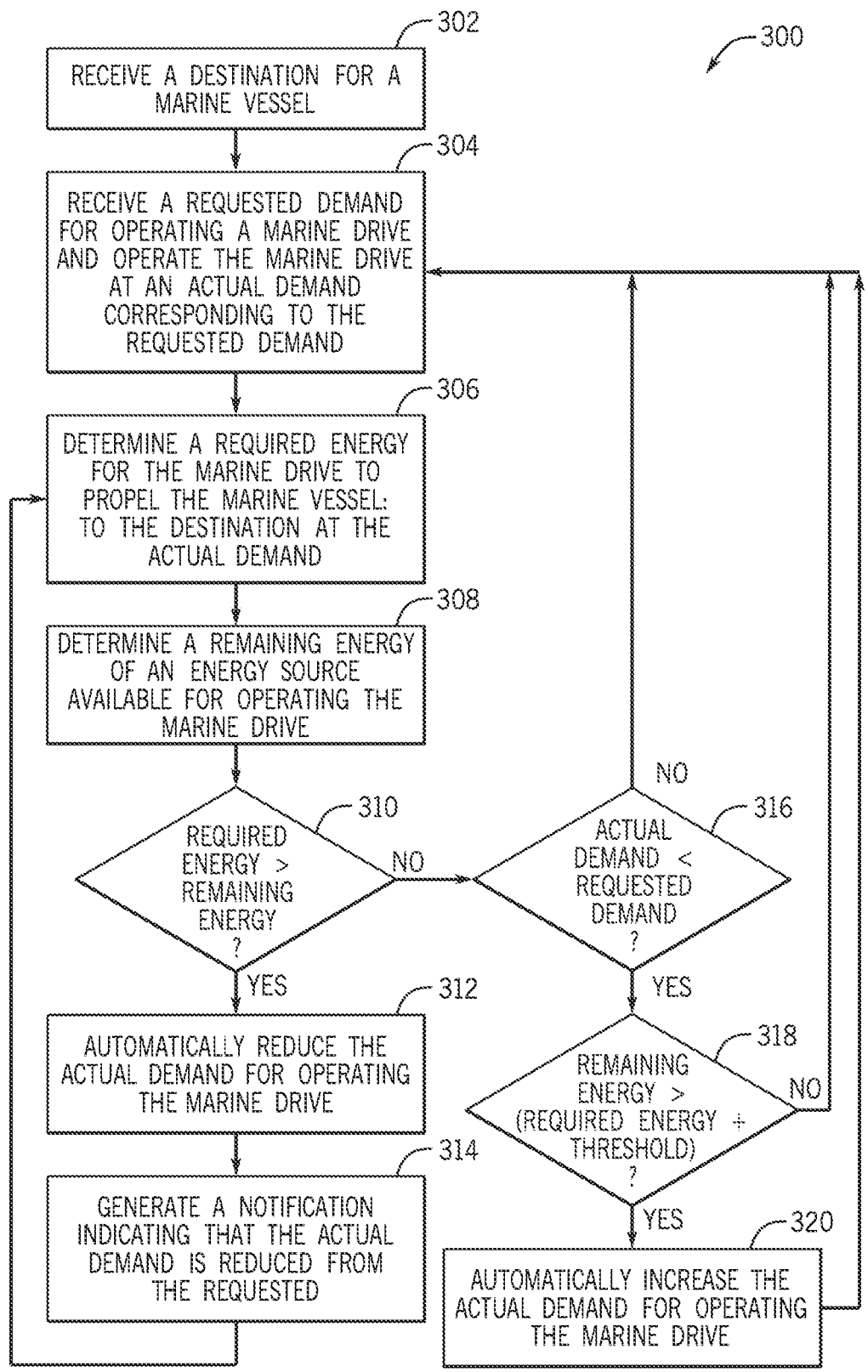
FIG. 7 is a flow chart showing another method for controlling a marine drive according to the present disclosure.

FIG. 7 shows another method 300 for controlling a marine drive to propel a marine vessel according to the present disclosure, which in this case details process steps for increasing the actual demand of a marine drive when reduced more than needed. Step 302 through step 314 may proceed in the same or a similar manner as steps 202 through 214 discussed above for the method 200 of FIG. 3, but for the steps after the required energy is determined to not exceed the remaining energy in step 310 (in other words, there is sufficient energy to reach the destination). In this case, a negative response to step 310 proceeds to step 316, which determines whether the actual demand is less than the demand request. If not, meaning that the demand request is equal to or below the actual demand, the process returns to step 304 (i.e., no adjustments are needed).

If instead the actual demand is found to be less than the demand request in step 316, the process proceeds to step 318. Step 318 determines whether the remaining energy exceeds the required energy by more than a threshold. As discussed above, the threshold may be presented as a percentage, watts, gallons, or other measures of remaining and required energy. If not, the process then returns to step 304 for continued monitoring.

If instead the remaining energy exceeds the required energy by more than the threshold, the process continued to step 320 in which the actual demand of the marine drive is automatically increased again, restoring some portion of the previously-reduced output authority. An example of this was shown in the graph 230 of FIG. 4, whereby the actual demand 240 is iteratively increased again at approximately time=35 seconds until being iteratively reduced again and ultimately arriving at settled actual demand in which the remaining distance and the distance to empty are equal (subject to safety reserves and the like). The process then returns to step 304 for continued monitoring.

In this manner, the presently disclosed systems and methods automatically control the marine drive for the marine vessel to reach the destination without running out of energy (electrical power and/or fuel) by managing the impact of speed and drag. Moreover, this control is handled iteratively so as to reduce the speed only as much as necessary, and in a manner that accommodates for changes in the energy remaining and the energy being used over time. It should be recognized that these solutions would not be possible with conventional marine drives and marine vessels presently known in the art. For example, the propulsion control module of an outboard motor does not receive data corresponding to the speed of the marine vessel in the water, the marine vessel's current location, nor its intended destination. Moreover, in a conventional setup, the display devices that handle maps and intended destinations do not have any access to the control systems of the marine vessel (e.g., throttle, shift, steering) at all. As such, it is not possible to automatically, iteratively control the marine drive (overriding the user's demand request) to reach the destination. Using the systems and methods presently disclosed, for example executable via an app that communicates with a marine drive, the controlled power of the marine drive can now be controlled in relation to the target destination of the marine vessel to advantageously perform the functions described above.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A method for controlling a marine drive configured to propel a marine vessel, the method comprising:
   receiving a destination for the marine vessel;
   receiving a demand request for operating the marine drive and operating the marine drive at an actual demand corresponding to the demand request;
   determining a required energy for the marine drive to propel the marine vessel to the destination at the actual demand;
   determining a remaining energy of an energy source available for operating the marine drive; and
   comparing the required energy to the remaining energy and, when the remaining energy is less than the required energy, automatically iteratively reducing the actual demand for operating the marine drive until the remaining energy equals or exceeds the required energy determined for the marine vessel to reach the destination.

2. The method according to claim 1, further comprising generating a notification on a user interface when the actual demand for operating the marine drive is reduced from the demand request.

3. The method according to claim 1, further comprising visually displaying on a display device a range in which the marine drive may propel the marine vessel based on the remaining energy.

4. The method according to claim 3, wherein the range comprises a first range and a second range corresponding to operating the marine drive at the demand request and at the actual demand, respectively, when the actual demand is reduced from the demand request.

5. The method according to claim 1, further comprising visually displaying the demand request and the actual demand when the actual demand is reduced from the demand request.

6. The method according to claim 5, further comprising wirelessly communicating with an external device, wherein the step of visually displaying is performed on a display of the external device.

7. The method according to claim 1, further comprising wirelessly communicating with an external device, wherein the destination is received from the external device.

8. The method according to claim 1, wherein the required energy is determined such that at least a safety reserve is estimated to remain in the remaining energy when the marine vessel reaches the destination.

9. The method according to claim 1, wherein the energy source is a battery system that provides electrical energy as the remaining energy for operating the marine drive.

10. The method according to claim 1, further comprising controlling the actual demand of the marine drive to correspond to the demand request when the demand request is less than the actual demand.

11. The method according to claim 1, further comprising detecting when the marine drive becomes engaged to propel the marine vessel, and further comprising resetting the actual demand for operating the marine drive to the demand request when the marine drive becomes engaged.

12. The method according to claim 1, wherein the actual demand of the marine drive is iteratively reduced by a set amount every set time period until the remaining energy equals or exceeds the required energy for the marine vessel to reach the destination.

13. The method according to claim 12, wherein the marine drive has a maximum demand for operation, and wherein the set amount is 10% of the maximum demand and the set time period is at least 2 seconds between each iteration.

14. The method according to claim 1, further comprising, after reducing the actual demand for operating the marine drive, increasing the actual demand for operating the marine drive when the remaining energy exceeds the required energy by more than a threshold.

15. The method according to claim 1, wherein the required energy and the remaining energy are determined as moving averages over time to thereby smooth fluctuations.

16. The method according to claim 1, wherein at least the steps of determining the required energy for operating the marine drive, determining the remaining energy of the energy source, and comparing the required energy to the remaining energy are performed at a predefined frequency.

17. A propulsion system for a marine vessel, the propulsion system comprising:
a marine drive configured to propel the marine vessel;
a control system operatively coupled to the marine drive and configured to control operation thereof, wherein the control system is configured to:
receive a destination for the marine vessel;
receive a demand request for operating the marine drive and to operate the marine drive at an actual demand corresponding to the demand request;
determine a required energy for the marine drive to propel the marine vessel to the destination at the actual demand;
determine a remaining energy of an energy source available for operating the marine drive; and
compare the required energy to the remaining energy and, when the remaining energy is less than the required energy, automatically iteratively reduce the actual demand of the marine drive until the remaining energy equals or exceeds the required energy determined for the marine vessel to reach the destination.

18. The propulsion system according to claim 17, wherein the control system is configured to be operatively coupled with a display device and to cause the display device to display the demand request and the actual demand when the actual demand is reduced from the demand request.

19. The propulsion system according to claim 17, wherein the control system is configured to be operatively coupled with a display device and to cause the display device to display a range in which the marine drive may propel the marine vessel based on the remaining energy and the required energy for the marine drive operating at the actual demand.

20. The propulsion system according to claim 17, wherein the control system is configured to receive a safety reserve and to determine the required energy for operating the marine drive at the actual demand such that at least the safety reserve remain in the remaining energy when the marine vessel reaches the destination.

* * * * *